United States Patent
Chen et al.

(10) Patent No.: US 10,120,464 B2
(45) Date of Patent: Nov. 6, 2018

(54) OPTICAL TOUCH SYSTEM AND OPTICAL TOUCH METHOD

(71) Applicant: Wistron Corporation, New Taipei (TW)

(72) Inventors: Yu-Yen Chen, New Taipei (TW); Po-Liang Huang, New Taipei (TW); Pei-Chen Chin, New Taipei (TW)

(73) Assignee: Wistron Corporation, New Taipei (TW)

( * ) Notice: Subject to any disclaimer, the term of this patent is extended or adjusted under 35 U.S.C. 154(b) by 861 days.

(21) Appl. No.: 14/522,598

(22) Filed: Oct. 24, 2014

(65) Prior Publication Data

US 2016/0034053 A1    Feb. 4, 2016

(30) Foreign Application Priority Data

Aug. 1, 2014  (TW) ............... 103126458 A

(51) Int. Cl.
*G06F 3/0354* (2013.01)
*G06F 3/042* (2006.01)

(52) U.S. Cl.
CPC ........ *G06F 3/03542* (2013.01); *G06F 3/0421* (2013.01); *G06F 2203/04104* (2013.01)

(58) Field of Classification Search
CPC ............... G06F 3/03542; G06F 3/0421; G06F 2203/04104
See application file for complete search history.

(56) References Cited

U.S. PATENT DOCUMENTS

| | | | |
|---|---|---|---|
| 6,100,538 A * | 8/2000 | Ogawa | G06F 3/03545 178/18.09 |
| 2013/0100075 A1 * | 4/2013 | Viswanathan | G06F 3/0416 345/175 |
| 2014/0043297 A1 * | 2/2014 | Su | G06F 3/042 345/175 |

* cited by examiner

*Primary Examiner* — Georgia Y Epps
*Assistant Examiner* — Don Williams
(74) *Attorney, Agent, or Firm* — Winston Hsu

(57) ABSTRACT

An optical touch system includes two touch devices, two optical sensing devices, and a processing module. When the optical touch system is in use according to an optical touch method, the two touch device are used to touch a touch surface and emit first light and second light with different wavelengths respectively. The two optical sensing devices are disposed at the circumference of the touch surface and individually receive the first light and the second light to generate an optical sensing signal. The processing module receives the two optical sensing signals and determines a touch position on the touch surface for each touch device according to the two optical sensing signals. Therefore, the touching by each touch device is independent, so the optical touch system and the optical touch method can allow touch operations for different purposes to be performed simultaneously.

13 Claims, 6 Drawing Sheets

OPTICAL TOUCH SYSTEM AND OPTICAL TOUCH METHOD

BACKGROUND OF THE INVENTION

1. Field of the Invention

The invention relates to an optical touch system, and especially relates to an optical touch system and method of multi-touch.

2. Description of the Prior Art

Touch control has been widely used and develops from single point touch control to multi-point touch control. The current multi-point touch control usually treats all touch points on a touch surface as a base of a single operation. For example, two touch points approaching or leaving away from each other will be regarded as an operation for scaling an image larger or smaller respectively. However, these touch points cannot be distinguished into different sources (for example the touches being performed by different users). In other words, no touch operations for different purposes at the same time is allowed by the current multi-point touch control, which makes the current multi-point touch control unable to deal with simultaneous interactive touches by different users. For example, a user is rotating an object while another user is writing or drawing an object at the same time. Such technique feature limits the application scope of the current multi-point touch control.

SUMMARY OF THE INVENTION

An objective of the invention is to provide an optical touch system, which allows two touch operations for different purposes at the same time.

The optical touch system of the invention is used for sensing two touches performed on a touch surface. The optical touch system includes two touch devices, two optical sensing devices, and a processing module. The touch devices are used for performing the two touches on the touch surface respectively. One of the touch devices is capable of emitting first light when the touch device touches the touch surface; the other touch device is capable of emitting second light when the touch device touches the touch surface. A central wavelength of the first light is different to a central wavelength of the second light. The two optical sensing devices are disposed at a circumference of the touch surface. Each optical sensing device includes an optical sensing unit, a first optical filter, and a second optical filter. A first sensing area and a second sensing area are defined on the optical sensing unit. The first optical filter is disposed above the first sensing area; the second optical filter is disposed above the second sensing area. The first optical filter allows light within a first wavelength band to pass; the second optical filter allows light within a second wavelength band to pass. The central wavelength of the first light is within the first wavelength band but not within the second wavelength band; the central wavelength of the second light is within the second wavelength band but not within the first wavelength band. Each optical sensing device uses the optical sensing unit to sense the first light and the second light and generates an optical sensing signal relative to the first light and the second light. The processing module is electrically connected to the optical sensing devices. The processing module receives the two optical sensing signals from the two optical sensing devices and determines a touch position of each touch device on the touch surface. Thereby, users can independently perform touch operations on the touch surface through the two touch devices at the same, which realizes directly interactive touch operations between users.

Another objective of the invention is to provide an optical touch method of allowing touch operations for two different purposes to be performed at the same time.

The optical touch method of the invention is used for an optical touch system to sense two touches on a touch surface. The optical touch system includes two optical sensing devices, two touch devices, and a processing module. The two optical sensing devices are disposed at a circumference of the touch surface. Each optical sensing device has a first sensing area and a second sensing area for receiving light within a first wavelength band and light within a second wavelength band respectively. One of the touch devices is capable of emitting first light when the touch device touches the touch surface; the other touch device is capable of emitting second light when the touch device touches the touch surface. A central wavelength of the first light is different to a central wavelength of the second light. The central wavelength of the first light is within the first wavelength band but not within the second wavelength band; the central wavelength of the second light is within the second wavelength band but not within the first wavelength band. The optical touch method includes using the two touch devices to perform the two touches on the touch surface and emit the first light and the second light respectively, using each optical sensing device to receive the first light and the second light and generate an optical sensing signal, and using the processing module to receive the two optical sensing devices from the two optical sensing signal and determine a touch position of each touch device on the touch surface. Thereby, users can independently perform touch operations on the touch surface through the two touch devices at the same, which realizes directly interactive touch operations between users.

Compared with the prior art, the invention uses the touch devices to emit distinguishable lights and uses the optical sensing devices to receive and distinguish them. Therefore, the invention can simultaneously identify the touch position of each touch device leading to the realization of interactive touch operations between users.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
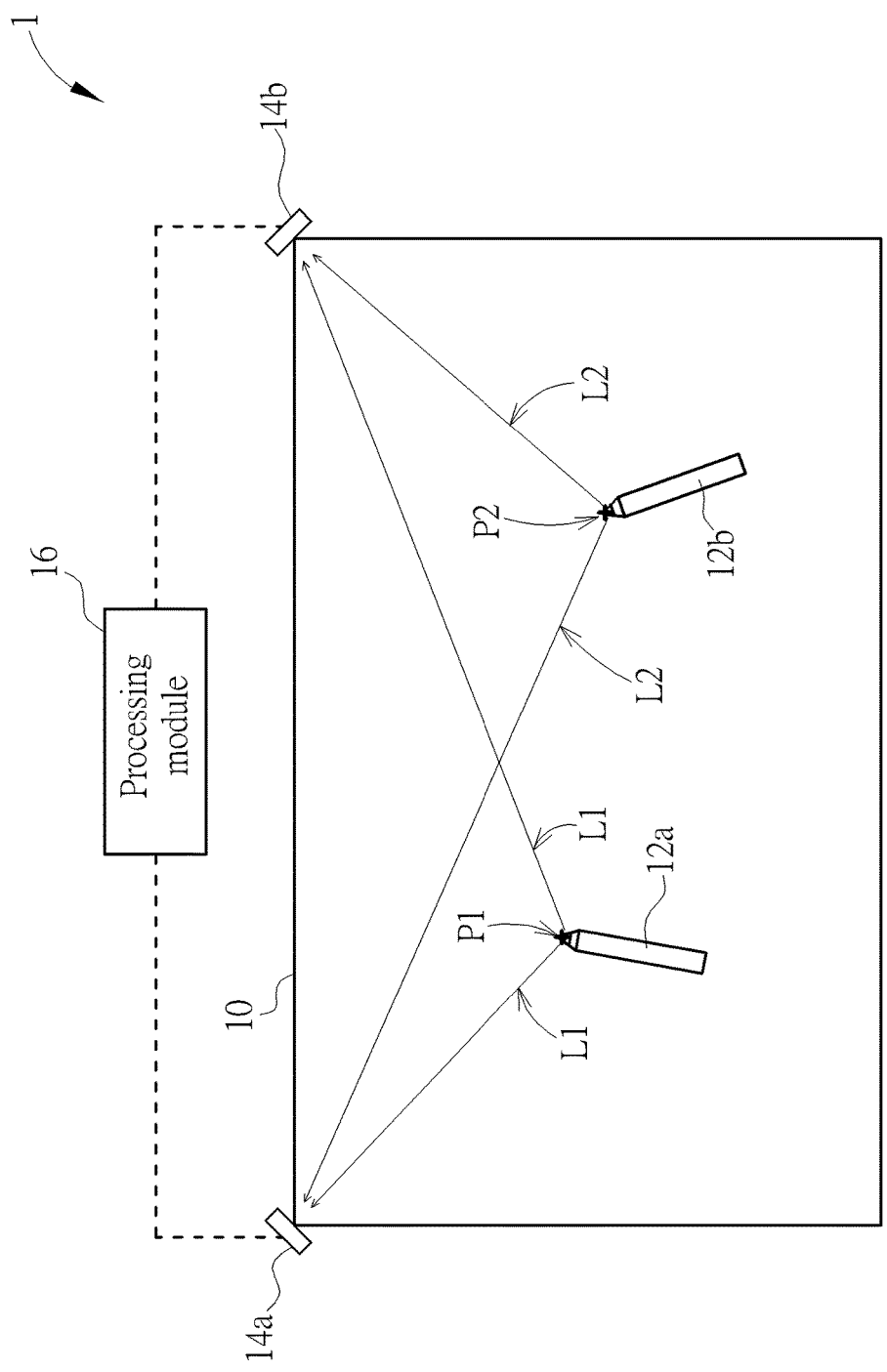
FIG. 1 is a schematic diagram illustrating an optical touch system of an embodiment according to the invention.
Figure 2:
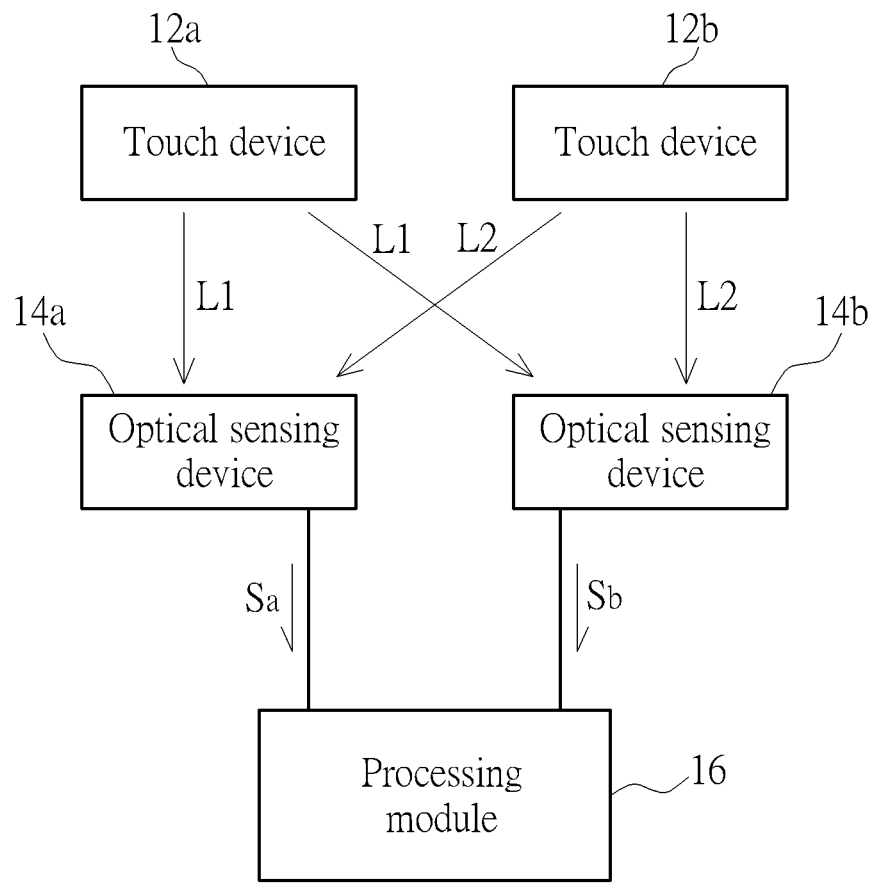
FIG. 2 is a function block diagram of the optical touch system in FIG. 1.

Please refer to FIG. 1 and FIG. 2. FIG. 1 is a schematic diagram illustrating an optical touch system 1 of an embodiment according to the invention. FIG. 2 is a function block diagram of the optical touch system 1. The optical touch system 1 is used for sensing touches on a touch surface 10. The optical touch system 1 includes two touch devices 12a and 12b, two optical sensing devices 14a and 14b, and a processing module 16. The touch device 12a is capable of emitting first light L1 when the touch device 12a touches the touch surface 10 while the touch device 12a is capable of emitting second light L2 when the touch device 12b touches the touch surface 10. Therein, the central wavelength of the first light L1 is different to the central wavelength of the second light L2, so that the first light L1 and the second light L2 can be distinguished from each other. The optical sensing devices 14a and 14b are disposed at a circumference of the touch surface 10. In the embodiment, the optical sensing devices 14a and 14b are disposed at two corners of the touch surface 10. Each of the optical sensing devices 14a and 14b receives the first light L1 and the second light L2 and generates a sensing signal Sa or Sb relative to the first light L1 and the second light L2. The processing module 16 is electrically connected to the two optical sensing devices 14a and 14b. The processing module 16 receives the two optical sensing signals Sa and Sb from the two optical sensing devices 14a and 14b and determines a touch position of each of the touch devices 12a and 12b on the touch surface 10. As shown in FIG. 1, the touch position P1 of the touch device 12a on the touch surface 10 and the touch position P2 of the touch device 12b on the touch surface 10 are represented by cross marks.

Figure 3:
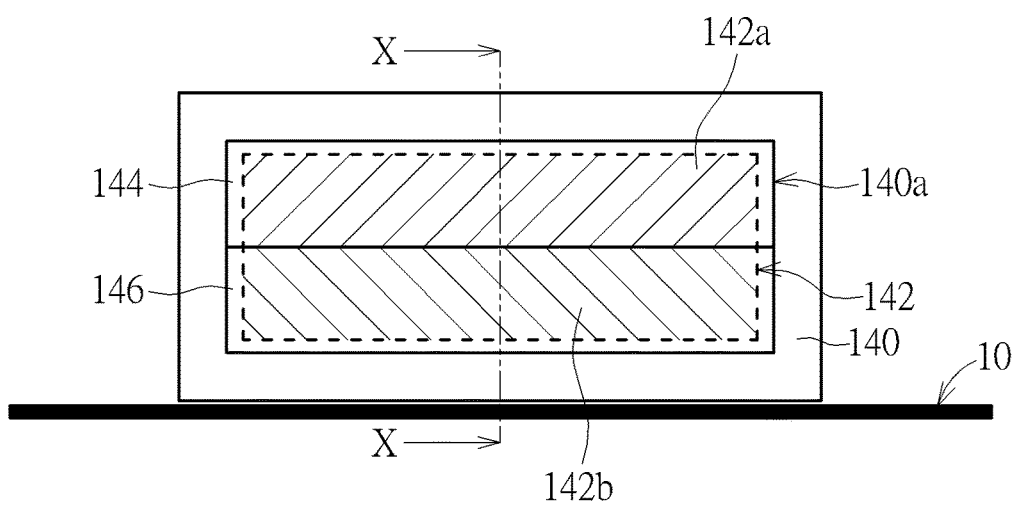
FIG. 3 is a top view of an optical sensing device of the optical touch system in FIG. 1.
Figure 4:
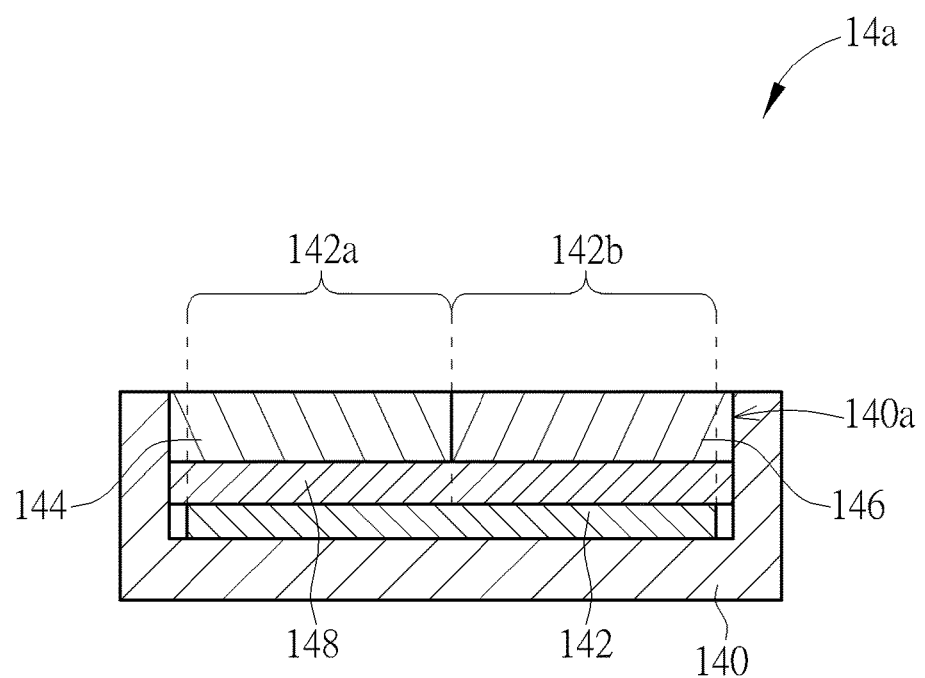
FIG. 4 is a sectional view of the optical sensing device in FIG. 3 along the line X-X.

Please also refer to FIG. 3 and FIG. 4. FIG. 3 is a top view of the optical sensing device 14a. FIG. 4 is a sectional view of the optical sensing device 14a along the line X-X in FIG. 3. FIG. 3 and FIG. 4 also can be applied to the optical sensing device 14b. Further, each of the optical sensing devices 14a and 14b includes a housing 140, an optical sensing unit 142, a first optical filter 144, and a second optical filter 146. The housing 140 has an opening 140a. The optical sensing unit 142 is disposed in the housing 140. The first optical filter 144 and the second optical filter 146 are disposed above and cover the optical sensing unit 142 and seal the opening 140a. In practice, the optical sensing unit 142 is usually also covered by a glass cover 148. In the embodiment, the optical sensing unit 142 is an area sensor which is a two-dimensional sensor. It is realizable to define a first sensing area 142a and a second sensing area 142b (which are indicated by hatched lines in FIG. 3) on the optical sensing unit 142. The first optical filter 144 is disposed above the first sensing area 142a; the second optical filter 146 is disposed above the second sensing area 142b. In other words, light received by the first sensing area 142a is filtered by the first optical filter 144; similarly, light received by the second sensing area 142b is filtered by the second optical filter 146. Thereby, according to the wavelength distributions of the first light L1 and the second light L2, the first optical filter 144 and the second optical filter 146 can be provided with obviously distinguishable different filter bands, so that each of the optical sensing devices 14a and 14b can distinguish the first light L1 and the second light L2 from each other, and then the processing module 16 can determine the touch positions P1 and P2 of the touch devices 12a and 12b respectively on the touch surface 10 according to the first light L1 and the second light L2.

In practice, each of the optical sensing devices 14a and 14b receives light through the first sensing area 142a of the optical sensing unit 142 and generates a first sensing signal; each of the optical sensing devices 14a and 14b also receives light through the second sensing area 142b of the optical sensing unit 142 and generates a second sensing signal. Each of the optical sensing signals Sa and Sb includes the first sensing signal and the second sensing signal. The processing module 16 receives the two optical sensing signals Sa and Sb and retrieves the two first sensing signals from the two optical sensing signals Sa and Sb to determine the touch position P1 of the touch device 12a on the touch surface 10, and the two second sensing signals from the two optical sensing signals Sa and Sb to determine the touch position P2 of the touch device 12b on the touch surface 10. In practice, the touch positions P1 and P2 can be determined in triangulation by receiving angles of the lights L1 and L2 by the optical sensing devices 14a and 14b.

In addition, in the embodiment, the wavelength distribution of the first light L1 is but not limited to 830~870 nm for example; the central wavelength thereof is 850 nm. The wavelength distribution of the second light L2 is but not limited to 900~940 nm for example; the central wavelength thereof is 920 nm. The first optical filter 144 allows light within a first wavelength band to pass; the first wavelength band is but not limited to 800~900 nm for example. The second optical filter 146 allows light within a second wavelength band to pass; the second wavelength band is but not limited to 900~1000 nm for example. By the above selection of the first optical filter 144 and the second optical filter 146, the central wavelength (850 nm) of the first light L1 is within the first wavelength band (800~900 nm) but not within the second wavelength band (900~1000 nm); the central wavelength (920 nm) of the second light L2 is within the second wavelength band (900~1000 nm) but not within the first wavelength band (800~900 nm). Moreover, in the embodiment, the wavelength distribution of the first light L1 is totally within the first wavelength band; the wavelength distribution of the second light L2 is totally within the second wavelength band. Furthermore, the first wavelength band and the second wavelength band do not overlap, so that each of the optical sensing devices 14a and 14b receives the first light L1 only through the first sensing area 142a of the optical sensing unit 142 to generate the first sensing signal, and receives the second light L2 only through the second sensing area 142b of the optical sensing unit 142 to generate the second sensing signal. Thereby, the first sensing signal is generated only based on the first light L1; the second sensing signal is generated only based on the second light L2. The processing module 16 can easily determine the touch position P1 of the touch device 12a, emitting the first light L1, on the touch surface 10 according to the two first sensing signal and also easily determine the touch position P2 of the touch device 12b, emitting the second light L2, on the touch surface 10 according to the two second sensing signal.

It is added that in the embodiment, the first wavelength band (800~900 nm) and the second wavelength band (900~1000 nm) are adjacent, but the invention is not limited thereto. For example, it is practicable to use two wavelength bands which are separate or overlaps. Furthermore, the selections of the wavelength bands and the light wavelength distributions affect each other. In practice, it is practicable to select the first optical filter 144 and the second optical filter 146 such that each of the optical sensing devices 14a and 14b can distinguish the first light L1 and the second light L2 from each other through the filtering effect of the first optical filter 144 and the second optical filter 146. Totally separate wavelength bands and totally separate light wavelength distributions can make the first sensing area 142a receive only the first light L1 and make the second sensing area 142b receive only the second light L2, which simplifies the mechanism for determining the touch positions P1 and P2 by the processing module 16 and improves the accuracy and reliability of the mechanism; however, the invention is not limited thereto. In general, in a wavelength distribution of light, the main intensity of the light occurs around its central wavelength. The intensity of the light far away from the central wavelength decreases greatly. Therefore, the wavelength band is selected to cover the partial wavelength distribution corresponding to the main intensity in principle, so that the sensing result can mainly respond to the light whose main intensity is within the wavelength band. Even though other light may partially pass through the optical filter, it will not affect the determination of the touch position because the intensity of the partial light (whose wavelength distribution is far away from the central wavelength of the light) passing through the optical filter is obviously lower. Hence, in practice, distinguish the first optical filter 144 and the second optical filter 146 from each other is not limited to the case that the wavelength bands do not overlap and the light wavelength distributions do not overlap either.

It is added that in the embodiment, as shown by FIG. 3, the first sensing area 142a and the second sensing area 142b are adjacent in a direction perpendicular to the touch surface 10 (represented by a solid line in FIG. 3). Base on this configuration, the first sensing area 142a and the second sensing area 142b of each of the optical sensing devices 14a and 14b have better image resolutions; however, the invention is not limited thereto. In addition, in the embodiment, each of the optical sensing devices 14a and 14b can be a single component which can be logically divided into two optical sensing units by using the first optical filter 144 and the second optical filter 146. Such design is conducive to the achievement of the optical sensing devices 14a and 14b by using a common area sensor with two optical filters; however, the invention is not limited thereto.

Figure 5:
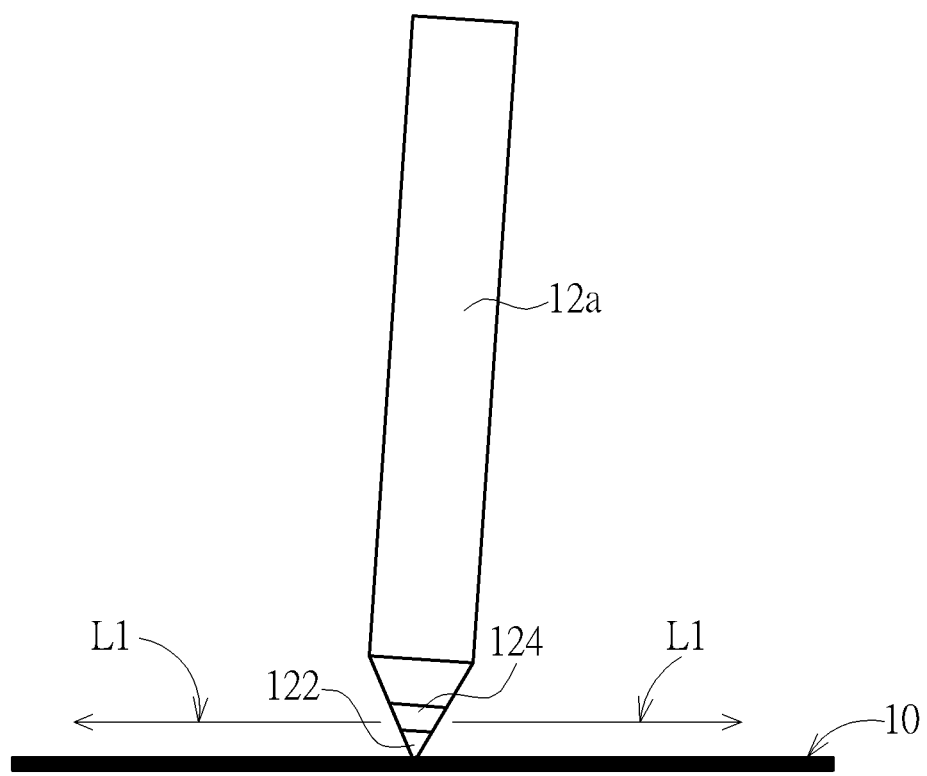
FIG. 5 is a side view of a touch device of the optical touch system in FIG. 1 when touching a touch surface.

Please refer to FIG. 5, which is a side view of the touch device 12a touching the touch surface 10 (represented by a solid line in the figure); it also can be applied to the touch device 12b. In the embodiment, in order to emit the first light L1 and the second light L2 when touching the touch surface 10, each of the touch devices 12a and 12b includes a switch 122 and a lighting module 24. The switch 122 is disposed at the front end of the housing; the lighting module 124 is disposed on the housing close to the front end. When either of the touch devices 12a and 12b touches the touch surface 10, the switch 122 is triggered to enable the lighting module 124 of the touch device 12a or 12b to emit the first light L1 or the second light L2 correspondingly (i.e. the touch device 12a emits the first light L1 in all directions; the touch device 12b emits the second light L2 in all directions). In addition, in practice, the switch 122 can be a tactile switch, so that the switch 122 can touch the touch surface 10 to be triggered when the touch device 12a or 12b touches the touch surface 10. However, the invention is not limited thereto; for example, the switch 122 can be realized by other proximity switches.

Figure 6:
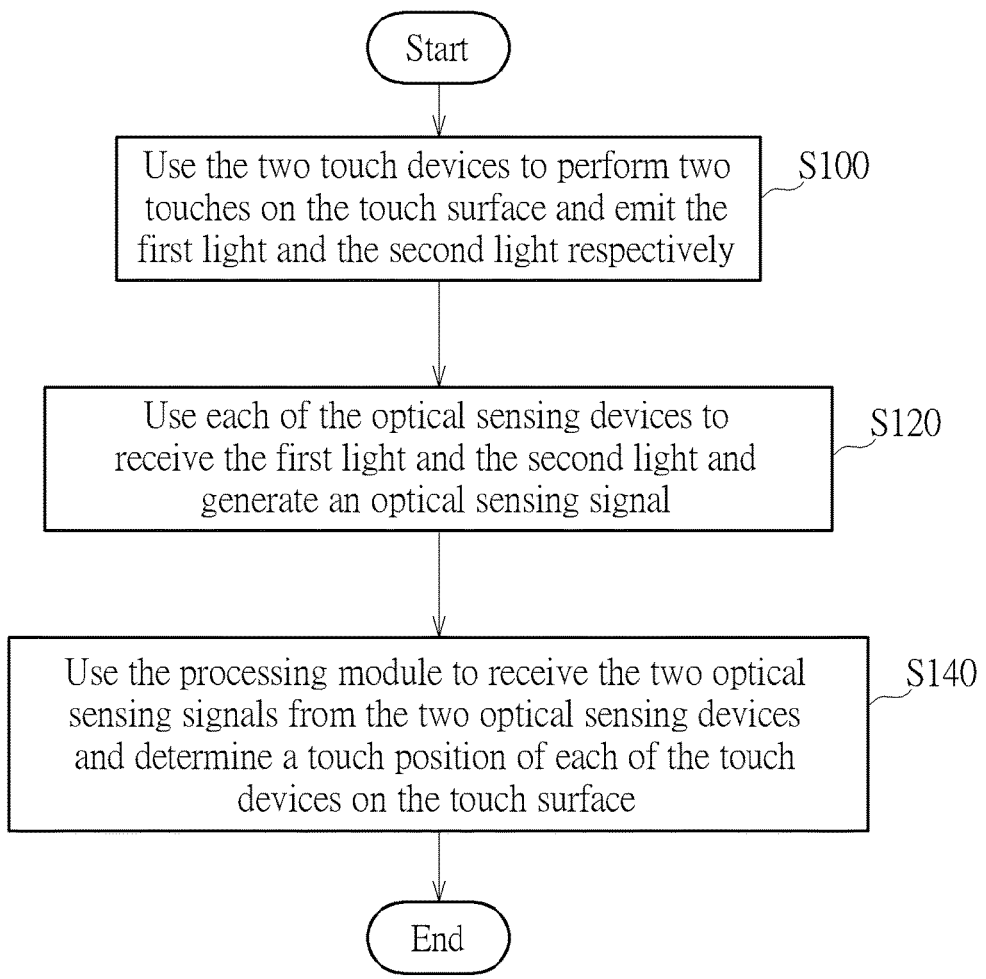
FIG. 6 is a flow chart of an optical touch method of an embodiment according to the invention.

Please refer to FIG. 6, which is a flow chart of an optical touch method of an embodiment according to the invention. In the embodiment, the optical touch method uses the optical touch system 1, so the relational descriptions about the operation of the optical touch system 1 are also applied herein and will not repeated. As shown by FIG. 6, the optical touch method is to use the two touch devices 12a and 12b to perform two touches on the touch surface 10 and emit the first light L1 and the second light L2 respectively, as shown by the step S100. The optical touch method is then to use each of the optical sensing devices 14a and 14b to receive the first light L1 and the second light L2 and generate an optical sensing signal Sa or Sb, as shown by the step S120.

The optical touch method is to use the processing module 16 to receive the two optical sensing signals Sa and Sb from the two optical sensing devices 14a and 14b and determine a touch position of each of the touch devices 12a and 12b on the touch surface 10 (e.g. the touch position P1 of the touch device 12a on the touch surface; the touch position P2 of the touch device 12b on the touch surface), as shown by the step S140.

In the embodiment, the first optical filter 144 allows only the first light L1 to pass; the second optical filter 146 allows only the second light L2 to pass. Therefore, in the step S120, each of the optical sensing devices 14a and 14b receives the first light L1 only through the first sensing area 142a of the optical sensing unit 142 to generate the first sensing signal, and receives the second light L2 only through the second sensing area 142b of the optical sensing unit 142 to generate the second sensing signal. Therein, each of the optical sensing signals Sa and Sb includes the first sensing signal and the second sensing signal. Furthermore, in the step S140, the processing module 16 determines the touch position P1 of the touch device 12a, emitting the first light L1, on the touch surface 10 according to the two first sensing signals and also easily determine the touch position P2 of the touch device 12b, emitting the second light L2, on the touch surface 10 according to the two second sensing signal. In addition, in the embodiment, in the step S100, the optical touch method is to use the touch devices 12a and 12b to touch the touch surface 10 so that the switch 122 is triggered to enable the touch device 12a or 12b to emit the first light L1 or the second light L2 correspondingly (e.g. the touch device 12a emits the first light L1 in all directions; the touch device 12b emits the second light L2 in all directions).

The above embodiments are based on that the two touch devices 12a and 12b are used to perform touch operations independently, which realizes directly interactive touch operations between users. However, the invention is not limited to use only two touch devices. In practice, each of the two optical sensing devices is provided with the same amount of optical filters as the used touch devices. The optical filters can divide the optical sensing unit of the optical sensing device into the same amount of sensing areas, so that the touch devices can perform touch operations independently, which enhances and expands the usage flexibility and applicable scope of the optical touch system of the invention further.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical touch system for sensing two touches performed on a touch surface, the optical touch system comprising:

two touch devices for performing the two touches on the touch surface respectively, one of the touch devices being capable of emitting first light when the touch device touches the touch surface, the other touch device being capable of emitting second light when the touch device touches the touch surface, a central wavelength of the first light being different to a central wavelength of the second light;

two optical sensing devices disposed at a circumference of the touch surface, each optical sensing device comprising an optical sensing unit, a first optical filter, and a second optical filter, a first sensing area and a second sensing area being defined on the optical sensing unit, the first optical filter being disposed above the first sensing area, the second optical filter being disposed above the second sensing area, the first optical filter allowing light within a first wavelength band to pass, the second optical filter allowing light within a second wavelength band to pass, the central wavelength of the first light being within the first wavelength band but not within the second wavelength band, the central wavelength of the second light being within the second wavelength band but not within the first wavelength band, each optical sensing device using the optical sensing unit to sense the first light and the second light and generating an optical sensing signal relative to the first light and the second light; and a processing module electrically connected to the optical sensing devices, the processing module receiving the two optical sensing signals from the two optical sensing devices and determining a touch position of each touch device on the touch surface.

2. The optical touch system of claim 1, wherein the first wavelength band and the second wavelength band are separate.

3. The optical touch system of claim 2, wherein a wavelength distribution of the first light is within the first wavelength band, and a wavelength distribution of the second light is within the second wavelength band.

4. The optical touch system of claim 1, wherein the optical sensing signal comprises a first sensing signal and a second sensing signal, the optical sensing device receives the first light only through the first sensing area of the optical sensing unit to generate the first sensing signal, the optical sensing device receives the second light only through the second sensing area of the optical sensing unit to generate the second sensing signal, according to the two first sensing signals, the processing module determines the touch position of the touch device emitting the first light on the touch surface, and according to the two second sensing signals, the processing module determines the touch position of the touch device emitting the second light on the touch surface.

5. The optical touch system of claim 1, wherein the first sensing area and the second sensing area are adjacent in a direction perpendicular to the touch surface.

6. The optical touch system of claim 1, wherein each optical sensing device comprises a housing having an opening, the optical sensing unit is disposed in the housing, the first optical filter and the second optical filter cover the optical sensing unit and seal the opening.

7. The optical touch system of claim 1, wherein each touch device comprises a switch, when the touch device touches the touch surface, the switch is triggered so that the touch device emits the first light or the second light correspondingly.

8. The optical touch system of claim 7, wherein the switch is a tactile switch.

9. An optical touch method for an optical touch system to sense two touches on a touch surface, the optical touch system comprising two optical sensing devices, two touch devices, and a processing module electrically connected to the optical sensing devices, the two optical sensing devices being disposed at a circumference of the touch surface, each optical sensing device having an optical sensing unit, a first optical filter and a second optical filter, a first sensing area and a second sensing area being defined on the optical sensing unit, the first optical filter being disposed above the first sensing area, the second optical filter being disposed above the second sensing area, the first optical filter allowing light within a first wavelength band to pass, the second optical filter allowing light within a second wavelength band to pass, one of the touch devices being capable of emitting first light when the touch device touches the touch surface, the other touch device being capable of emitting second light when the touch device touches the touch surface, a central wavelength of the first light being different to a central wavelength of the second light, the central wavelength of the first light being within the first wavelength band but not within the second wavelength band, the central wavelength of the second light being within the second wavelength band but not within the first wavelength band, the optical touch method comprising the following steps:

(a) using the two touch devices to perform the two touches on the touch surface and emit the first light and the second light respectively;

(b) using the optical sensing unit of each optical sensing device to receive the first light and the second light and generate an optical sensing signal relative to the first light and the second light; and (c) using the processing module to receive the two optical sensing signals from the two optical sensing devices and determine a touch position of each touch device on the touch surface.

10. The optical touch method of claim 9, wherein the first wavelength band and the second wavelength band are separate.

11. The optical touch method of claim 10, wherein a wavelength distribution of the first light is within the first wavelength band, and a wavelength distribution of the second light is within the second wavelength band.

12. The optical touch method of claim 9, wherein the optical sensing signal comprises a first sensing signal and a second sensing signal, in the step (b), each optical sensing device receives the first light only through the first sensing area of the optical sensing unit to generate the first sensing signal and each optical sensing device receives the second light only through the second sensing area of the optical sensing unit to generate the second sensing signal, and in the step (c), according to the two first sensing signals, the processing module determines the touch position of the touch device emitting the first light on the touch surface, and according to the two second sensing signals, the processing module determines the touch position of the touch device emitting the second light on the touch surface.

13. The optical touch method of claim 9, wherein each touch device comprises a switch, in the step (a), the switch is triggered by the touch device touching the touch surface, so that the touch device emits the first light or the second light correspondingly.

* * * * *